April 9, 1963 L. R. BROWN 3,085,227
DETECTION OF CHARACTERS
Filed March 11, 1960 2 Sheets-Sheet 1
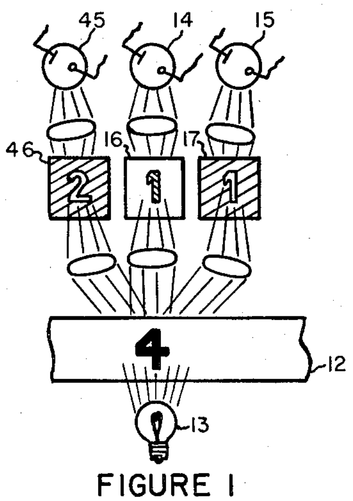
FIGURE I
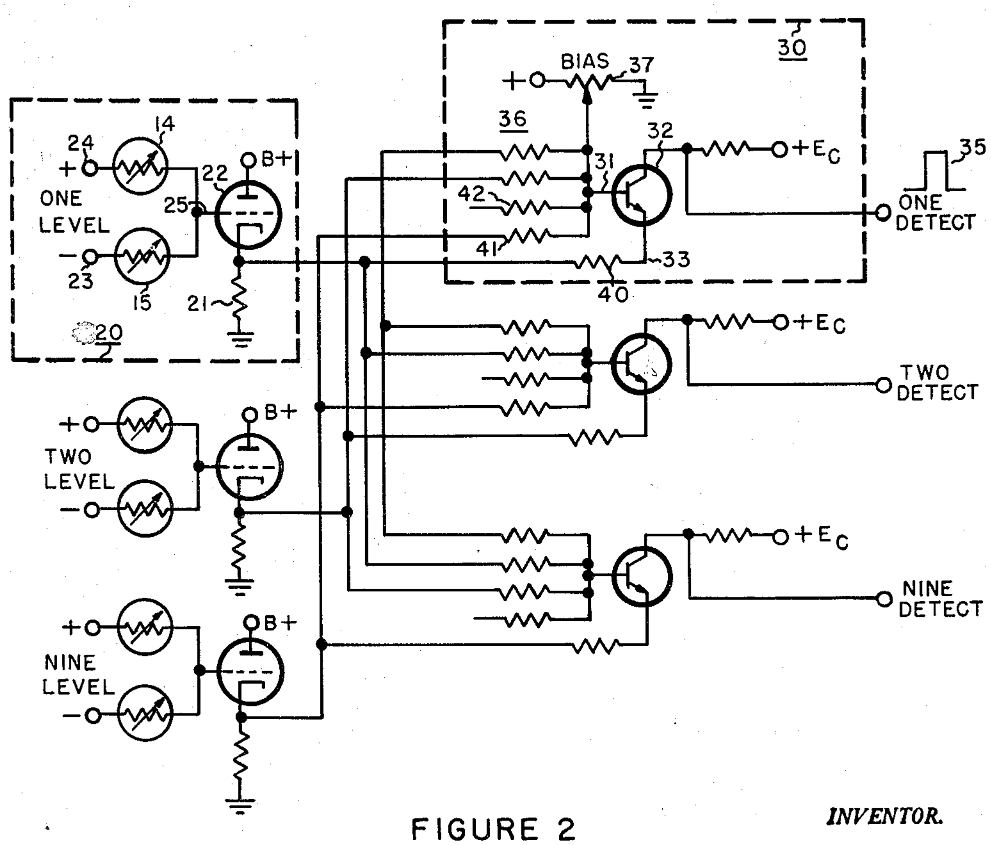
FIGURE 2
INVENTOR.
Laurence R. Brown April 9, 1963 L. R. BROWN 3,085,227

DETECTION OF CHARACTERS

Filed March 11, 1960 2 Sheets-Sheet 2

INVENTOR.

Laurence R. Brown

United States Patent Office 3,085,227
Patented Apr. 9, 1963

3,085,227

DETECTION OF CHARACTERS

Laurence R. Brown, Berwyn, Pa., assignor, by mesne assignments, to Drexel Dynamics Corporation, Philadelphia, Pa., a corporation of Pennsylvania Filed Mar. 11, 1960, Ser. No. 14,352
6 Claims. (Cl. 340—146.3)

Figure 3:
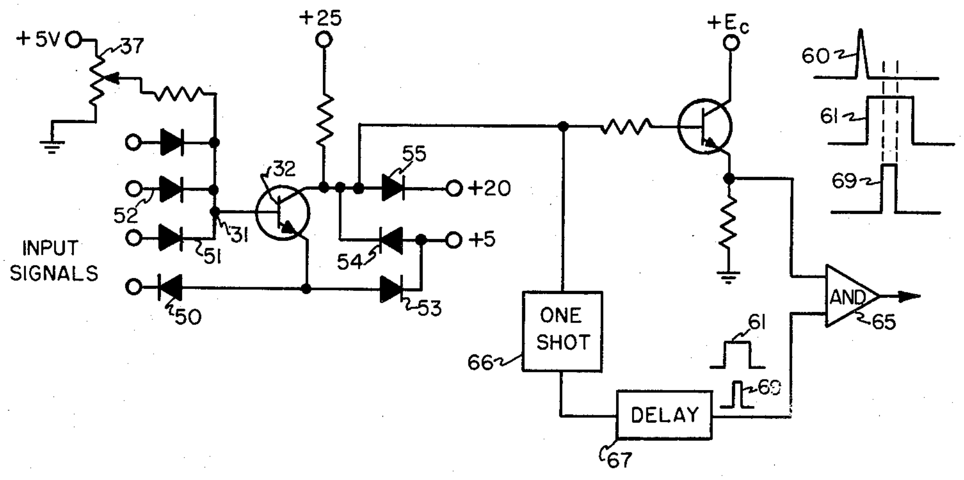

This invention relates to detection methods and more specifically it relates to electronic circuits for automatic selection of characters.

In electronic reading systems of the prior art drastic restrictions have been imposed upon operating conditions including requirements for special characters that must be presented for reading. Thus special precautions have been required in printing text uniformly so that variations of contrast or definition will not cause erroneous readings. Furthermore extreme care has been necessary in holding circuit tolerances and detector responses within close limits.

For example, consider character detection by the map comparison method of matching an unknown character with several stored patterns. This results in generation of a maximum signal amplitude level at a time when a particular identification pattern is in registration with the unknown character. Thus, a single detected signal may be observed by selecting that signal channel having an amplitude level above a predetermined threshold. However, variations in contrast conditions or detector response may cause signals to vary in amplitude enough to induce erroneous decisions.

Furthermore, conditions may exist which produce decisions from out-of-code characters. Thus, suppose the letter S is presented, which would tend to produce a best signal condition in a detector for the numerical digit 5 out of a set of ten decimal digits to be read. This condition should be detectable to prevent an erroneous reading.

It is a general object of this invention to provide improved character recognition circuits and detection methods by-passing the hereinbefore mentionad inadequacies.

Another objective of the invention is to provide signal detection means for positively identifying signals within a certain set and rejecting signals outside the set.

It is another object of the invention to provide circuits for detecting a unique condition without regard to closely maintained circuit tolerances or signal amplitude variations.

A further object of the invention is to afford character recognition means not requiring critical input signal conditions or special care in providing perfect text for analysis.

In accordance with this invention, there is provided a character recognition detection system capable of distinguishing statically at a single viewing the identity of a character. Thus, comparison of an unknown character is made with each of a plurality of stored patterns to determine a best match indicative of the identity of that character. For example, ten patterns would be used to determine the identity of an unknown numerical digit in the set of the ten decimal digits 0 through 9. A photocell detector may be used to determine light passed by each pattern during comparison to provide a signal proportional in amplitude to the degree of similarity between the unknown character and the respective patterns.

A method of detecting the most prominent signal by differential comparison is afforded by this invention so that variations in amplitude levels or circuit parameters, such as caused by heat or ambient light, have little effect in disturbing the proper decision. This is accomplished by a circuit effectively providing digital automatic selection control. Selection is made by comparison of one signal from a group of signals differentially with all of the remaining signals to determine whether it is most prominent regardless of signal amplitudes.

In this respect, the comparison is made in one embodiment of the invention by an electron discharge device having two input electrodes for receiving input signals from a plurality of channels. One of the signals is presented in opposite polarity to the others at the input electrodes so that it may effect a change in the conducting state of the electron discharge device. One exemplary circuit comprises a normally conductive transistor having the unique signal coupled to the emitter circuit and the remaining signals coupled to the base circuit. The signals are connected in the proper polarity to cut off conduction when the emitter signal is of greater amplitude than the rest. Thus, any variations in signal level operating similarly upon all channels (such as contrast background changes at the character viewing station or power supply variations) have little effect upon the ultimate decision.

Figure 4:
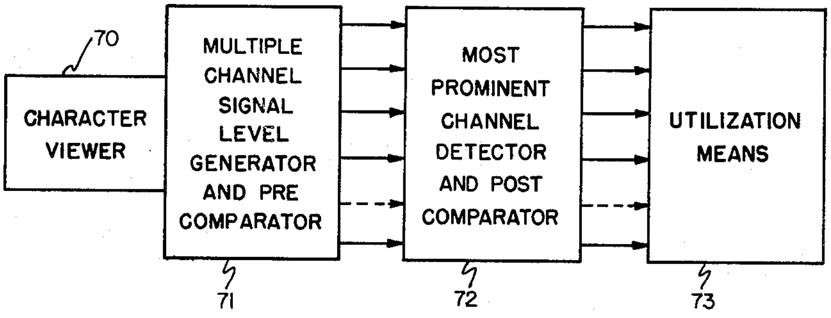

The foregoing features and objects of the invention together wtih further advantages are explained in detail with reference to the accompanying drawing, wherein:

FIGURE 1 is a diagrammatic view of character recognition detection means employed in accordance with the present invention, FIGURES 2 and 3 are schematic circuit diagrams of detection circuits afforded by the invention, and FIGURE 4 is a block diagram of a character recognition system embodiment of the invention.

In FIGURE 1 is displayed a partial view of means for identifying characters by the map comparison method. An unknown character such as the 4 on carrier strip 12 is presented at a viewing station. Light from lamp 13 is used to excite photocells 14, 15, etc. as a function of comparative differences (or similarities) between the unknown character and the stored maps or character patterns 16, 17, etc. The use of positive and negative images respectively at 16 and 17 for identifying a single character presents several advantages in a static detection system as described in my copending application for Character Distinction Means, S.N. 3,859, filed January 21, 1960, and assigned to the same assignee. The features of this technique applicable to the present invention are described herein.

For purposes of identifying the character 1, photocells 14, 15 may be used in connection with a detection circuit 20 shown in FIGURE 2. The basic differential detector circuit 20 is similar to that described in my copending application Serial No. 14,214 for Character Selection Device filed the same day as this application and assigned to the same assignee. This circuit in operation depends upon relative response of two photocells 14, 15 (shown as variable resistors) to produce an output signal at the cathode resistor 21 or tube 22. Assume that the ground level is set relative to grid voltage terminals 23 and 24 to hold the tube 22 in the cutoff region during the quiescent state of photoresistors 14 and 15. Then either a reduction of resistance 14 or an increase of resistance 15 would tend to cause the tube to conduct.

With reference to FIGURE 1, it can be seen that when a character 1 is presented in registration with map 16, the cell 14 has full light and will present a low resistance value if a direct resistance versus light repsonse is assumed. Conversely cell 15 is obscured from light and will present a high resistance value when viewing a character 1. However, if a character 4 is presented, the cell 14 will have considerable light obscured and the resistance will raise so that cell 15 is used for further distinction. The cumulative effect of cells 14 and 15 is to produce a voltage at grid 25 of tube 22 such that the tube is conducting when the proper character is viewed and is otherwise not conducting. However, the tube may be operated in class A condition if desired, and is still responsive to the combined effect of both photocells 14 and 15.

This detection circuit 20 operates as a pre-comparator circuit to reject out of code characters in accordance with the present invention. Thus, consider the maps 16, 17 of FIGURE 1 which displays the character 1. Suppose that an out-of-code character is presented such as the letter L. Because of the effect upon map 16 in reducing the light on cell 14 and action of detection circuit 20, this character will be rejected, even though its best signal out of the maps for all ten numerical digits 0 through 9 may be that of digit 1. This is of significance when operable in combination with the post-comparator circuit 30 which serves to make a best out of ten selection.

In the most prominent signal selection operation provided by the second detector phase of comparator circuit 30, input signals to the base terminal 31 of NPN transistor 32 must be overcome in amplitude by the differential signal from a single channel presented at emitter terminal 33. Thus, the one channel detect output will go positive as shown by waveform 35 when transistor 32 is cut off by prominence of the signal from the one channel pre-comparator output resistor 21 in overcoming all other levels introduced at input resistors 36.

The variable bias resistor 37 provides to keep transistor 32 in conduction in the absence of any signal and provides a threshold level which must be exceeded by the emitter signal before switching the transistor conduction state. This bias also aids to set the threshold for rejection of out-of-code characters when the preceding cathode follower tube 22 is operated class A.

Input resistors 40, 41, etc. for the transistor are used to isolate the various signal sources, and may be replaced as shown in FIGURE 3 by corresponding diodes, if preferred. This is desirable when the number of input signals becomes large since it permits greater tolerances in design of the transistor stage.

The overall selection of a numerical character 0 to 9 is dependent upon all the stages exemplified in FIGURE 2, where it is understood that the one, two and nine level are representative of the other stages three to eight and zero, which are simularly connected to input resistors 42, etc.

Since all signals are generated in the manner shown in FIGURE 1, there can be only one most prominent signal channel satisfying the circuit requirements, and therefore at the second detector output circuits (one detect level, etc.) there is a one out of ten output code available. Each cathode follower circuit drives all ten output circuits, nine comprising low power base input connections and one comprising a drive source for the output of the transistor as coupled through the emitter input circuit. The cathode follower circuit is an ideal match between high empedances of photoresistive devices 14, 15 and the transistor input circuits requiring current actuation rather than voltage.

This circuit functionally serves to automatically regulate the operation to conform with signal level variations encountered in character recognition systems. Thus, it may be considered a form of automatic level control. In considering FIGURE 1, it may be seen that any contrast variations between the carrier strip 12 and the character (4) thereon will affect all photocells alike. That is, a reduced contrast will result in less prominent signal amplitudes and vice-versa. However, since the circuit shown in FIGURE 2 is dependent only upon the relative or differential amplitudes of the input signals rather than a fixed threshold value, a positive digital selection is made at all contrast levels within the input circuit capabilities. Other variations, such as changes of temperature and light level at the photocells or power supply voltage variations which affect all channels similarly are also ineffective to change the reliability of selection afforded by this differential comparison method of detection.

Conditions which may be encountered under some circumstances in this type of selection are avoided by variations in the basic circuit as shown in FIGURE 3. For example the resistors in the comparator circuit are replaced by diodes 50, 51, 52 to prevent interaction between the circuits without introducing inhibition of the signals as required by restricting current flow with resistors. Also, the emitter and collector circuits are clamped by diodes 53, 54, and 55 to establish definite operating levels.

In the selection operation different circuit paths may cause a slight mistiming between signals at the transistor base and emitter electrodes. Thus, consider waveform 60 where a spike is generated (rather than a desired signal selection shown by waveform 61) when a time race occurs between amplitudes of the respective signals at transistor base and emitter terminals 31 and 33 respectively and the emitter goes negative for a short time interval. To eliminate the possibility of such excursions from interpretation as output decisions, a gating circuit 65 is employed.

By using one-shot circuit 66 to generate a gating waveform 67 of limited duration, and delaying the waveform for comparison with the output signal 61 in "and" gate 65, the resultant output signal 69 will only be generated when the complete signal waveform 61 occurs, rather than when any spikes 60 may be generated. This avoids questions of time race at transistor 32.

FIGURE 4 displays in block diagram form the general organization of a character recognition system constructed in accordance with the teachings of this invention. Thus, a character viewer stage 70 develops a multiple channel signal in pre-comparator stage 71, which serves to reject out of code characters and input noise conditions. A second detector stage 72 is employed as hereinbefore described for distinguishing the most prominent signal used in operating the output utilization device 73.

Accordingly, the method of dynamic gain control employing differential signal comparison disclosed by this invention, tends to prevent significant contrast changes in input character signal channels from disturbing the reliability of character recognition decisions.

Having thus produced advanced means and methods for detecting unique signals useful in automatic reading systems, the features of novelty are defined with particularity in the appended claims.

I claim:

1. In a character recognition system for recognizing individual ones of a group of characters of selected configurations; a group of positive pattern areas each transparent except for an opaque pattern of a different one of said characters; a group of negative pattern areas each opaque except for a transparent pattern of a different one of said characters; a message-bearing medium having thereon characters to be recognized, said characters having substantially different light transmissive properties than the remainder of said medium; a reading station; a light source; a first lens system comprising a different lens area for each pattern area of each the positive and negative groups; said light source, reading station, message-bearing medium, first lens system, and said positive and negative pattern groups being so positioned that light rays from said source pass through said message-bearing medium at said reading station and are focused by said first lens system as an image on each of the pattern areas of both said positive and negative pattern groups, said image being in the same phase on both the positive and negative pattern groups; a second lens system comprising a different lens area for each pattern area of each the positive and negative groups; a plurality of pairs of photo-conductive devices the resistance of which varies as a function of the light impressed thereon for developing electrical signals corresponding to light information received, there being a different pair of such devices for each different character in the group, said second lens system and said pairs of photo-conductive devices being so positioned that light rays passing through each different pattern area of both said positive and negative pattern groups are focused on a different one of said photo-conductive devices with the light rays which pass through the negative and positive pattern areas of a particular character being focused separately on one and the other device respectively of a pair of photo-conductive devices; means connecting each pair of photo-conductive devices in series across a source of D.-C. voltage; a plurality of first electronic switching devices, one for each pair of photo-conductive devices, each first switching device having input elements and having conductive and nonconductive states as determined by the voltage applied across its input elements; means connecting one of the photo-conductive devices of each series pair across the input elements of a different one of said first switching devices; a plurality of second electronic switching devices, one for each first switching device, each having input and output elements; means for applying the output of each of said first switching devices across the input elements of a different one of said second switching devices in one polarity and means for also applying the output of each of said first switching elements in parallel across the input elements of all of the other of said second switching devices in the other polarity to establish a dynamic bias of said other polarity tending to retain said second switching devices in one state, thereby, in response to an output signal from one of said first switching devices of a magnitude exceeding that of the bias of other polarity, to cause one of said second switching devices to change to its other state, all other of said switching devices remaining in the said one state.

2. Apparatus as claimed in claim 1 characterized in that said first electronic switching devices are cathode follower tubes, and further characterized in that said second electronic switching devices are transistors.

3. Apparatus as claimed in claim 2 further characterized in that means are provided for supplying a fixed bias across the input elements of said transistors in the same polarity as said dynamic bias.

4. Apparatus as claimed in claim 3 still further characterized in that said fixed and dynamic biases are of a polarity which tend to maintain said transistors in the conductive state.

5. In a character recognition system for recognizing individual characters of different but similar configurations; a positive pattern area for each such character transparent except for an opaque pattern of said character; a negative pattern area for each such character opaque except for a transparent pattern of said character; a light-transparent message-bearing medium having thereon opaque characters to be recognized; a reading station; a light source; a first lens system comprising a different lens for each positive and negative pattern area, said light source, reading station, message-bearing medium, first lens system, and positive and negative pattern areas being so positioned that light rays from said source pass through said message-bearing medium at said reading station and are focused by said first lens system as an image on each of both said positive and negative pattern areas, said image being in the same phase on both said positive and negative pattern areas for passing, in the event of coincidence between the character being read and the pattern, minimum light and maximum light at the negative and positive patterns, respectively; a second lens system comprising a different lens for each the positive and negative pattern areas; a pair of photo-conductive devices associated respectively with the positive and negative pattern areas for developing electrical signals corresponding to light information received, said second lens system and said photo-conductive devices being so positioned that light rays passing through said negative and positive pattern areas are focused on one and the other respectively of said pair of photoconductive devices; means connecting the pair of photo-conductive devices in series across a source of D.-C. voltage; a plurality of first electronic switching devices each having input elements and having conductive and nonconductive states as determined by the voltage applied across its input elements; means connecting one of the photo-conductive devices of each series pair across the input elements of a different one of said first switching devices; a plurality of second electronic switching devices, each having input and output elements; means coupling the output of each of said first switching devices across the input elements of a different one of said second switching devices in one polarity and means for also applying the output of each of said first switching elements in parallel across the input elements of all of the other of said second switching devices in the other polarity to establish a dynamic bias of said other polarity tending to retain said second switching devices in one state, thereby, in response to an output signal from one of said first switching devices of a magnitude exceeding that of the bias of other polarity, to cause one of said second switching devices to change to its other state, all other of said switching devices remaining in the same one state.

6. Apparatus as claimed in claim 5 characterized in that the means connecting one of the photo-conductive devices of each pair across the input elements of a different one of said first switching devices are means connecting the photo-conductive device which is associated with the negative pattern.

References Cited in the file of this patent

UNITED STATES PATENTS

| | | |
|---|---|---|
| 2,851,638 | Wittenberg et al. | Sept. 9, 1958 |
| 2,853,633 | McVey | Sept. 23, 1958 |
| 2,872,596 | Day | Feb. 3, 1959 |
| 2,880,331 | MacSorley | Mar. 31, 1959 |
| 2,898,576 | Bozeman | Aug. 4, 1959 |
| 2,919,425 | Ress | Dec. 29, 1959 |
| 2,924,812 | Merritt et al. | Feb. 9, 1960 |
| 2,956,118 | Goodrich | Oct. 11, 1960 |